US006839432B1

(12) United States Patent
Martin

(10) Patent No.: US 6,839,432 B1
(45) Date of Patent: Jan. 4, 2005

(54) PHONE PROTECTOR AND STORAGE CASE

(76) Inventor: Douglas J. Martin, 1218 W. 2175 North, Clinton, UT (US) 84015

( * ) Notice: Subject to any disclaimer, the term of this patent is extended or adjusted under 35 U.S.C. 154(b) by 340 days.

(21) Appl. No.: 09/881,963

(22) Filed: Jun. 15, 2001

(51) Int. Cl.[7] .................................................. H04M 1/00
(52) U.S. Cl. ........................ 379/446; 379/440; 379/447; 379/433.01; 379/428.01
(58) Field of Search ............................ 379/428.01, 437, 379/446, 433.01, 440, 447

(56) References Cited

U.S. PATENT DOCUMENTS

| 4,677,654 A | * | 6/1987 | Lagin et al. ................... 379/58 |
| 5,253,292 A | | 10/1993 | Fluder et al. |
| 5,383,091 A | | 1/1995 | Snell |
| D366,258 S | * | 1/1996 | Fraser et al. ................ D14/138 |
| 5,653,336 A | | 8/1997 | Buonaiuto et al. |
| 5,678,204 A | | 10/1997 | Naylor |
| 5,816,459 A | | 10/1998 | Armistead |
| 6,141,417 A | * | 10/2000 | Lopez et al. ................. 379/446 |

* cited by examiner

Primary Examiner—Jack Chiang
Assistant Examiner—M. C. Ubiles

(57) ABSTRACT

A phone protector and storage case for protecting and holding a cellular phone. The phone protector and storage case includes a housing having a bottom wall, a front wall, a back wall, a top wall, a first side wall and a second side wall. The front wall has a top half and a bottom half. The top half comprises a door extending into the top wall and the side walls. A hinge hingedly couples the door to the first side wall. The door is selectively positioned between an open position and a closed position. A cellular phone is removably positionable in the housing.

6 Claims, 5 Drawing Sheets

PHONE PROTECTOR AND STORAGE CASE

BACKGROUND OF THE INVENTION

1. Field of the Invention

The present invention relates to phone protecting devices and more particularly pertains to a new phone protector and storage case for protecting and holding a cellular phone.

2. Description of the Prior Art

The use of phone protecting devices is known in the prior art. More specifically, phone protecting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,816,459; 5,383,091; 5,678,204; 5,653,336; Des. 366,258; and 5,253,292.

While these devices fulfill their respective, particular objectives and requirements, the aforementioned patents do not disclose a new phone protector and storage case. The inventive device includes a housing having a bottom wall, a front wall, a back wall, a top wall, a first side wall and a second side wall. The front wall has a top half and a bottom half. The top half comprises a door extending into the top wall and the side walls. A hinge hingedly couples the door to the first side wall. The door is selectively positioned between an open position and a closed position. A cellular phone is removably positionable in the housing.

In these respects, the phone protector and storage case according to the present invention substantially departs from the conventional concepts and designs of the prior art, and in so doing provides an apparatus primarily developed for the purpose of protecting and holding a cellular phone.

SUMMARY OF THE INVENTION

In view of the foregoing disadvantages inherent in the known types of phone protecting devices now present in the prior art, the present invention provides a new phone protector and storage case construction wherein the same can be utilized for protecting and holding a cellular phone.

The general purpose of the present invention, which will be described subsequently in greater detail, is to provide a new phone protector and storage case apparatus and method which has many of the advantages of the phone protecting devices mentioned heretofore and many novel features that result in a new phone protector and storage case which is not anticipated, rendered obvious, suggested, or even implied by any of the prior art phone protecting devices, either alone or in any combination thereof.

To attain this, the present invention generally comprises a housing having a bottom wall, a front wall, a back wall, a top wall, a first side wall and a second side wall. The front wall has a top half and a bottom half. The top half comprises a door extending into the top wall and the side walls. A hinge hingedly couples the door to the first side wall. The door is selectively positioned between an open position and a closed position. A cellular phone is removably positionable in the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new phone protector and storage case apparatus and method which has many of the advantages of the phone protecting devices mentioned heretofore and many novel features that result in a new phone protector and storage case which is not anticipated, rendered obvious, suggested, or even implied by any of the prior art phone protecting devices, either alone or in any combination thereof.

It is another object of the present invention to provide a new phone protector and storage case which may be easily and efficiently manufactured and marketed.

It is a further object of the present invention to provide a new phone protector and storage case which is of a durable and reliable construction.

An even further object of the present invention is to provide a new phone protector and storage case which is susceptible of a low cost of manufacture with regard to both materials and labor, and which accordingly is then susceptible of low prices of sale to the consuming public, thereby making such phone protector and storage case economically available to the buying public.

Still yet another object of the present invention is to provide a new phone protector and storage case which provides in the apparatuses and methods of the prior art some of the advantages thereof, while simultaneously overcoming some of the disadvantages normally associated therewith.

Still another object of the present invention is to provide a new phone protector and storage case for protecting and holding a cellular phone.

Yet another object of the present invention is to provide a new phone protector and storage case which includes a housing having a bottom wall, a front wall, a back wall, a top wall, a first side wall and a second side wall. The front wall has a top half and a bottom half. The top half comprises a door extending into the top wall and the side walls. A hinge hingedly couples the door to the first side wall. The door is selectively positioned between an open position and a closed position. A cellular phone is removably positionable in the housing.

Still yet another object of the present invention is to provide a new phone protector and storage case that protects a cellar phone from damage while allowing a user to hear the phone.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
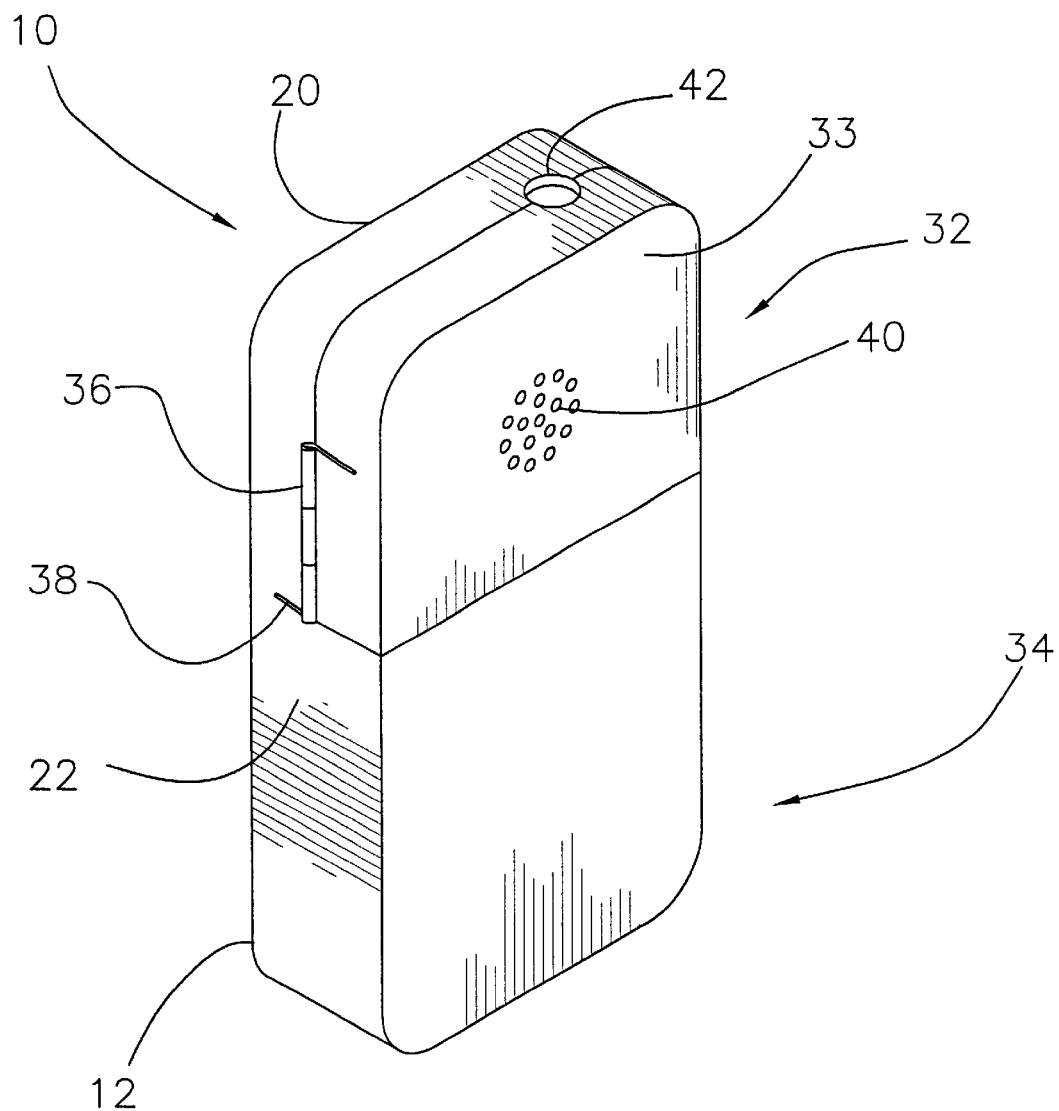
FIG. 1 is a schematic perspective view of a new phone protector and storage case according to the present invention.
Figure 2:
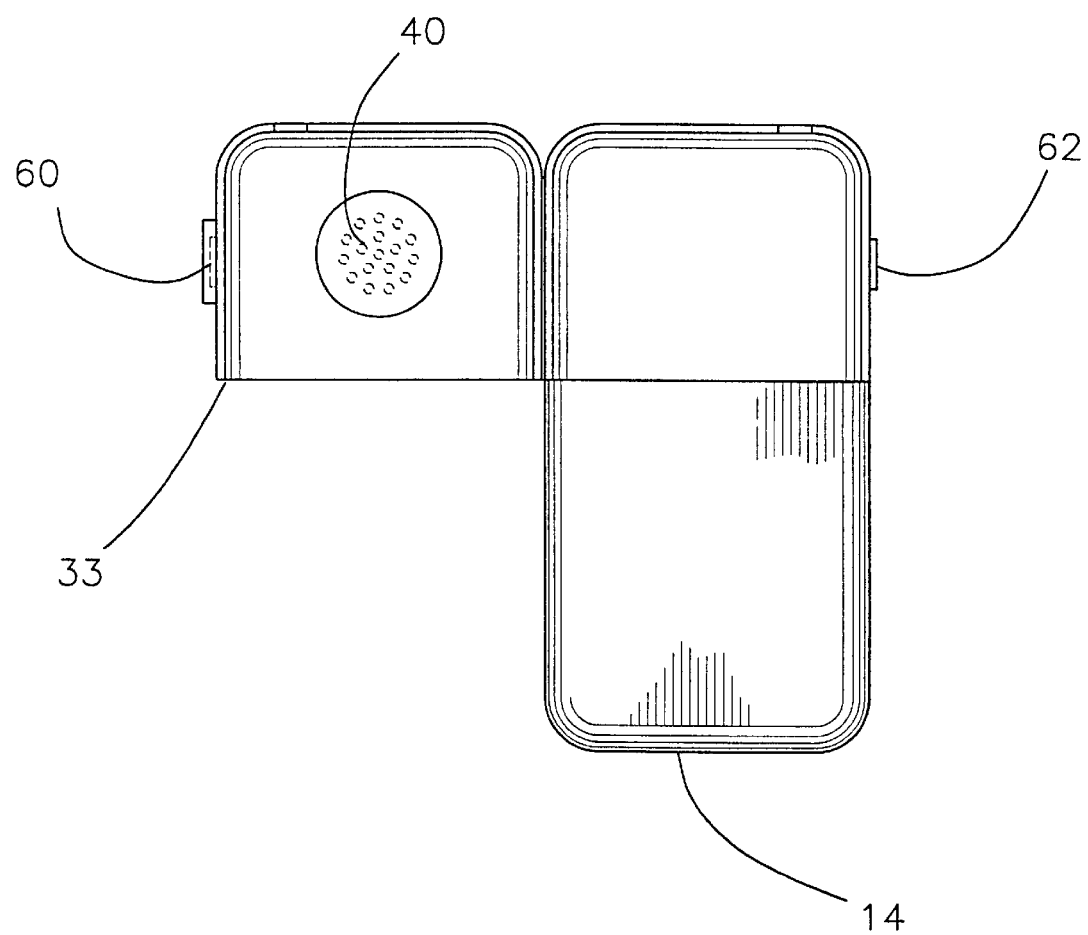
FIG. 2 is a schematic front view of the present invention.
Figure 3:
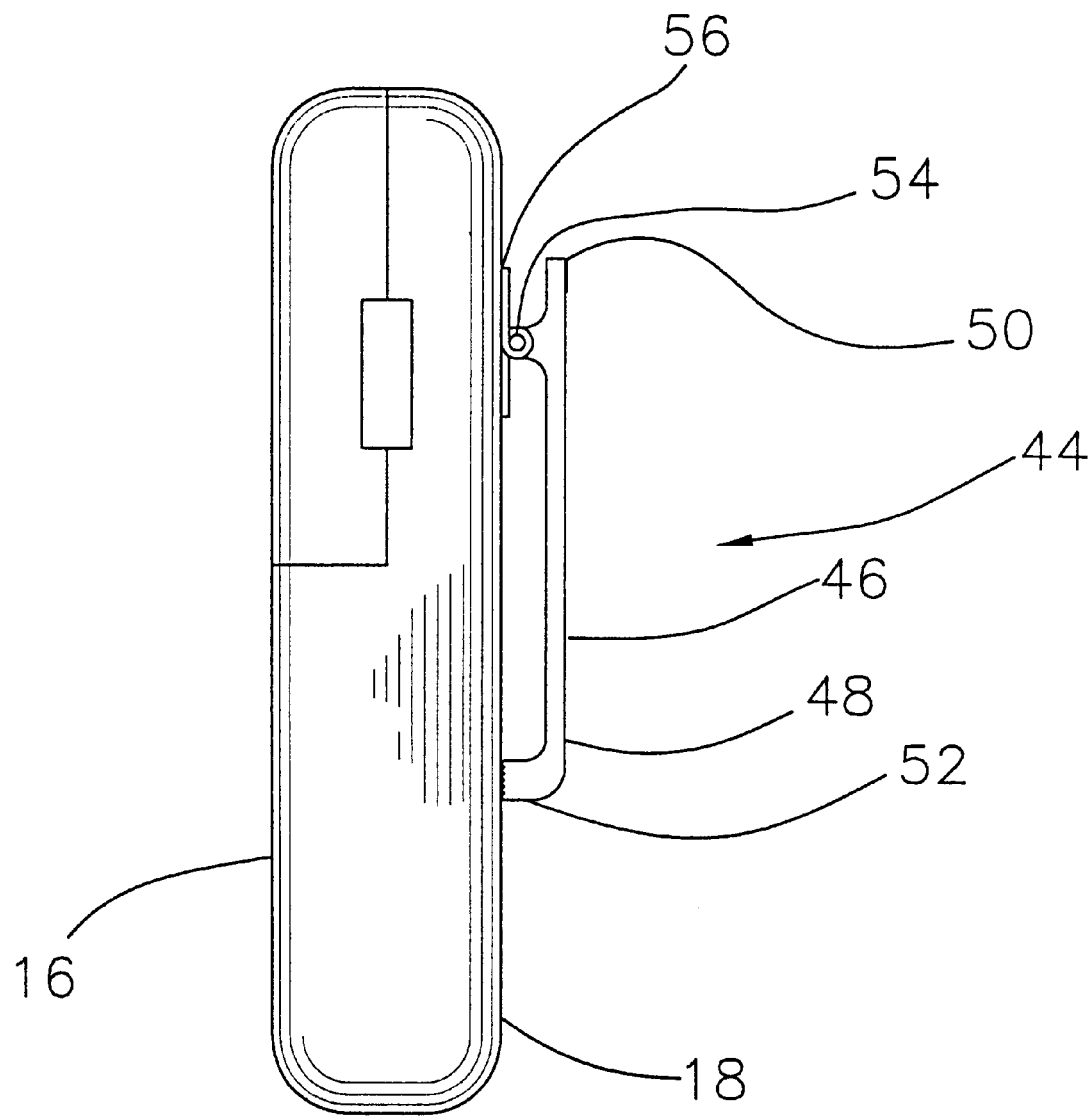
FIG. 3 is a schematic side view of the present invention.
Figure 4:
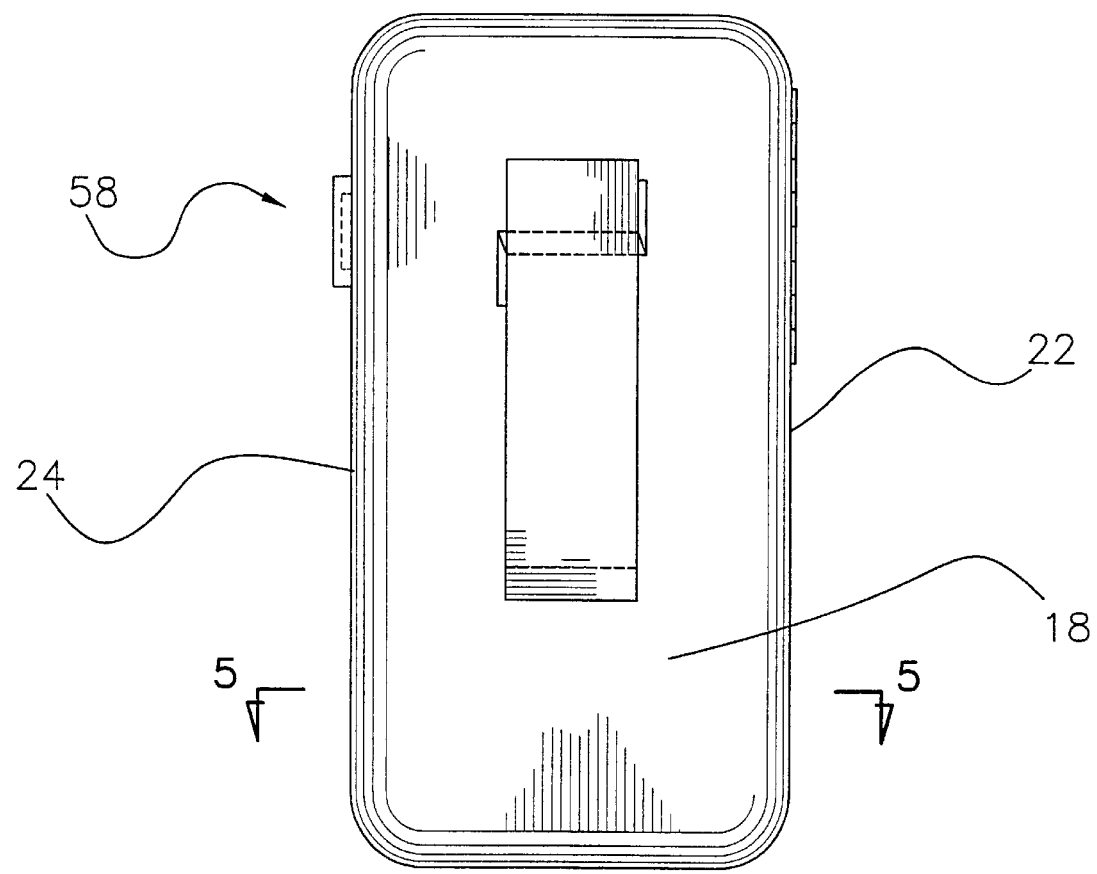
FIG. 4 is a schematic back view of the present invention.
Figure 5:
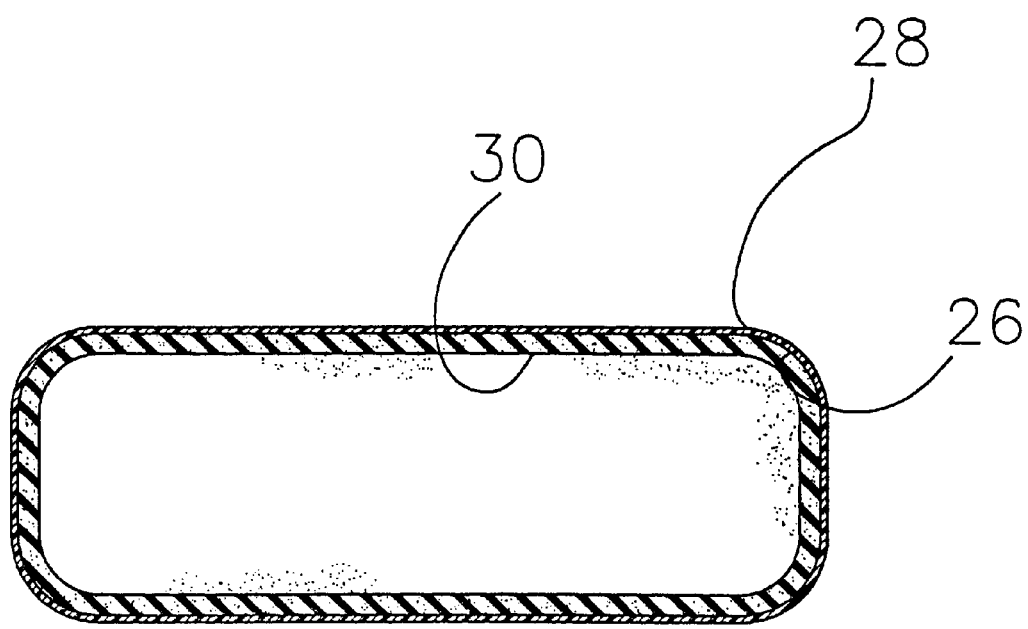
FIG. 5 is a schematic cross-sectional view taken along line 5—5 of FIG. 4 of the present invention.

With reference now to the drawings, and in particular to FIGS. 1 through 5 thereof, a new phone protector and storage case embodying the principles and concepts of the present invention and generally designated by the reference numeral 10 will be described.

As best illustrated in FIGS. 1 through 5, the phone protector and storage case 10 generally comprises device for removably receiving a cellular phone. The device 10 comprises a housing 12 having a bottom wall 14, a front wall 16, a back wall 18, a top wall 20, a first side wall 22 and a second side wall 24. The housing 12 has an inner surface 26 and an outer surface 28. The inner surface 26 has a cushioning material 30 attached to it which substantially covers the inner surface 26. The front wall 16 has a top half 32 and a bottom half 34. The top half 32 comprises a door 33 extending into the top wall 20 and the side walls 22, 24. A hinge 36 hingedly couples the door 33 to the first side wall 22. The door 33 is selectively positioned between an open position and a closed position. A biasing means 38 biases the door 33 in the closed position. The biasing means 38 comprises a spring positioned on the hinge 36. The door 33 has a plurality of apertures 40 extending therethrough. The top wall 20 has an opening 42 therein positioned nearer the second side wall 24 than the first side wall 22 for receiving the antenna of a cellular phone. The opening 42 extends into an upper portion of the door 33 defined by the top wall 20. The walls of the housing 12 preferably comprise a plastic material.

A clip member 44 is hingedly attached to the back wall 18. The clip member 44 comprises an elongated member 46 having a first end 48 and a second end 50. The first end 48 has a foot 52 thereon. A hinge 54 is attached to the clip member 44 and is positioned generally adjacent to the second end 50 such that the foot 52 is directed toward the back wall 18. An urging means 56 is attached to the hinge 54 on the clip member 44 and urges the foot 52 member against the back wall 18.

Also envisioned is a securing member 58 for securing the door 33 in a closed position and includes a female portion 60 adapted for frictionally coupling to a male portion 62.

In use, a cellular phone is positioned in the housing 12 such that the antenna is positioned in the hole 42 in the top wall 20. The housing 12 protects the cellular phone and allows a user to hear the phone through the apertures 40 in the door 33. The cushioning material 30 further enhances the protective properties of the housing 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cellular phone holding and protection device for removably receiving a cellular phone comprising:

a housing having a bottom wall, a front wall, a back wall, a top wall, a first side wall and a second side wall, said housing having an inner surface and an outer surface, said front wall having a top half and a bottom half, said top half comprising a door extending into said top wall and said side walls, a hinge hingedly coupling said door to said first side wall, said door being selectively positioned between an open position and a closed position;

said inner surface has a cushioning material substantially covering and being attached thereto;

said door has a plurality of apertures extending therethrough;

said top wall has an opening therein, said opening being positioned nearer said second side wall than said first side wall, said opening extending into an upper portion of said door defined by said top wall.

2. The cellular phone bolding and protection device as in claim 1, wherein a biasing means biases said door in said closed position.

3. The cellular phone holding and protection device as in claim 1, wherein said clip member comprises an elongated member having a first end and a second end, said first end having a foot thereon, a hinge being attached to said clip member and being positioned generally adjacent to said second end such that said foot is directed toward said back wall, an urging means being attached to said hinge on said clip member and urging said foot member against said back wall.

4. The cellular phone holding and protection device as in claim 1, further including a clip member being hingedly attached to said back wall.

5. The cellular phone holding and protection device as in claim 4, wherein said clip member comprises an elongated member having a first end and a second end, said first end having a foot thereon, a hinge being attached to said clip member and being positioned generally adjacent to said second end such that said foot is directed toward said back wall, an urging means being attached to said hinge on said clip member and urging said foot member against said back wall.

6. A cellular phone holding and protection device for removably receiving a cellular phone comprising:

a housing having a bottom wall, a front wall, a back wall, a top wall, a first side wall and a second side wall, said housing having an inner surface and an outer surface, said inner surface having a cushioning material substantially covering and being attached thereto, said front wall having a top half and a bottom half, said top half comprising a door extending into said top wall and said side walls, a hinge hingedly coupling said door to said first side wall, said door being selectively positioned between an open position and a closed position, a biasing means biasing said door in said closed position, said biasing means comprising a spring positioned on said hinge, said door having a plurality of apertures extending therethrough, said top wall having an opening therein, said opening being positioned nearer said second side wall than said first side wall, said opening extending into an upper portion of said door defined by said top wall; and a clip member being hingedly attached to said back wall, said clip member comprising an elongated member having a first end and a second end, said first end having a foot thereon, a hinge being attached to said clip member and being positioned generally adjacent to said second end such that said foot is directed toward said back wall, an urging means being attached to said hinge on said clip member and urging said foot member against said back wall.

* * * * *